(No Model.)
F. J. FREESE.
TIRE.
No. 586,764.      Patented July 20, 1897.
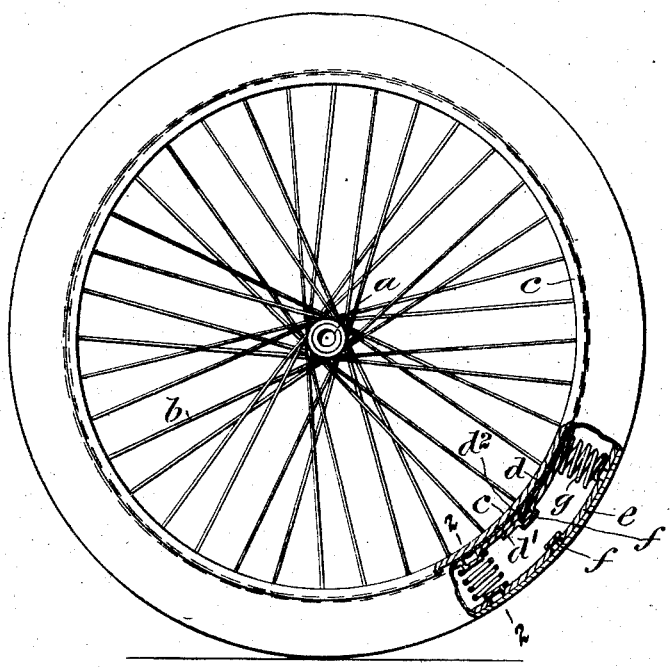
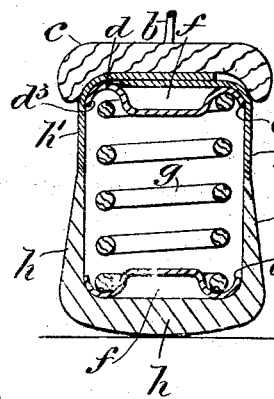 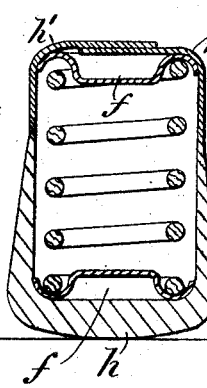 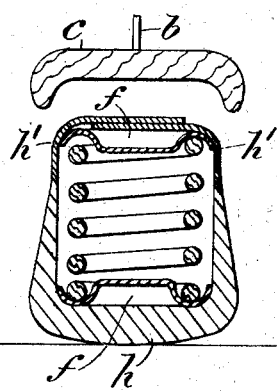
Witnesses
Inventor
Francis Joseph Freese
By his Attorney

UNITED STATES PATENT OFFICE.

FRANCIS JOSEPH FREESE, OF LOWELL, MASSACHUSETTS, ASSIGNOR OF ONE-HALF TO JOHN AUGUSTINE RAFTER, OF MONTREAL, CANADA.

TIRE.

SPECIFICATION forming part of Letters Patent No. 586,764, dated July 20, 1897.

Application filed October 10, 1895. Serial No. 565,282. (No model.)

*To all whom it may concern:*

Be it known that I, FRANCIS JOSEPH FREESE, of Lowell, in the State of Massachusetts, but temporarily residing in the city of Montreal, Province of Quebec, Canada, have invented certain new and useful Improvements in Tires; and I do hereby declare that the following is a full, clear, and exact description of the same.

My invention relates to the class of tires described and illustrated in Letters Patent of the United States of America granted to me on the 16th of July, 1895, under No. 542,678, for improvements in wheels; and it has for its object, primarily, to adapt the tire therein described so that it can be removably attached to the rim of any wheel, and, secondly, to improve the construction thereof.

For full comprehension of the invention reference must be had to the accompanying drawings, forming a part of this specification, in which like symbols indicate the same parts, and wherein—

Figure 1 is a side elevation, partly in section, of a wheel fitted with a tire constructed according to my present invention; Fig. 2, a transverse vertical sectional view thereof, taken on line 2 2, Fig. 1; Fig. 3, a similar view to Fig. 2, but showing the tire in its extended state as it appears before being compressed to be set on the rim of the wheel; and Fig. 4 is a similar view to Fig. 2, showing the tire compressed.

The hub $a$, spokes $b$, and rim $c$ do not form any part of my present invention, the form shown being only for purposes of illustration, as my tire can be applied to any of the well-known wheels at present in use.

My improved tire consists, preferably, of inner and outer rings (lettered $d$ and $e$, respectively) composed of resilient material, preferably steel, the inner ring $d$ being open and having its ends $d'$ $d^2$ overlapping each other, and the edges $d^3$ of each ring are turned inward toward each other, as shown in Fig. 1, and a series of projections $f$, pressed radially therefrom, arranged and spaced so that the projections from each ring will be diametrically opposite the projections of the other. Each pair of these projections $f$, situated opposite to one another, are adapted to act as guides for a coiled spring $g$, and these several parts can be held in their positions relative to each other by any usual and well-known form of tire-covering, but I prefer to use a covering of peculiar formation.

My improved covering, which is particularly adapted to my present form of tire, consists of a thick woven or textile central portion $h$, diminished in thickness from its center toward its sides, and forms the tread and the lower portions of the sides of the tire, and an elastic portion $h'$ on each side of and cemented or otherwise connected to such textile central portion $h$, and the textile and elastic portions together being of sufficient width to encircle the two rings $d$ and $e$ and springs $h$ and have the edges overlap each other in order that they may be connected together. When this is done, the tire will be complete and it will only be necessary to compress the springs through the inner ring, which, being open, will expand and allow of the compression of all the springs at once sufficiently to place the tire around the rim of a wheel, when, upon their being released, they will naturally expand and cause the tire to grip the rim and thus be held firmly in place.

A covering of an even thickness throughout or one composed entirely of rubber can be substituted for the one described, or blocks of rubber for the springs $g$, or the construction, arrangement, and combination of the parts changed, without departing in any way from the spirit of my invention.

What I claim is as follows:

1. A wheel-tire composed of an inner open ring, an outer intact flexible ring, a series of yielding resistances located between such inner and outer rings and a flexible covering for the whole, for the purpose set forth.

2. A wheel-tire composed of an inner open ring, and an outer intact flexible ring, each ring being formed with a series of guides, a series of coiled springs having their ends located about such guides, and a flexible covering for the whole, for the purpose set forth.

3. A wheel-tire composed of an inner open ring, and an outer intact flexible ring, each ring being formed with a series of guides formed in one therewith, a series of coiled springs having their ends located about such guides, and a flexible covering for the whole, for the purpose set forth.

4. A wheel-tire composed of an inner open ring, an outer intact flexible ring, a series of yielding resistances located between such inner and outer rings and a flexible covering for the whole formed partially of textile or woven material and partially of elastic material, for the purpose set forth.

5. A wheel-tire composed of an inner open ring, and an outer intact flexible ring, each ring being formed with a series of guides formed in one therewith, a series of coiled springs having their ends located about such guides, and a flexible covering for the whole formed partially of textile or woven material and partially of elastic material, for the purpose set forth.

FRANCIS JOSEPH FREESE.

Witnesses:
WILL. P. McFEAT,
FRED. J. SEARS.